(12) United States Patent
Asente

(10) Patent No.: US 7,616,203 B1
(45) Date of Patent: Nov. 10, 2009

(54) ASSIGNING ATTRIBUTES TO REGIONS ACROSS FRAMES

(75) Inventor: Paul J. Asente, La Honda, CA (US)

(73) Assignee: Adobe Systems Incorporated, San Jose, CA (US)

(*) Notice: Subject to any disclaimer, the term of this patent is extended or adjusted under 35 U.S.C. 154(b) by 0 days.

(21) Appl. No.: 11/336,077

(22) Filed: Jan. 20, 2006

(51) Int. Cl.
*G06T 13/00* (2006.01)

(52) U.S. Cl. .................. 345/473; 345/474; 345/475

(58) Field of Classification Search .......... 345/473–475
See application file for complete search history.

(56) References Cited

U.S. PATENT DOCUMENTS

| | | | | |
|---|---|---|---|---|
| 4,952,051 A * | 8/1990 | Lovell et al. | .......... | 352/87 |
| 5,050,984 A * | 9/1991 | Geshwind | .......... | 352/38 |
| 5,270,756 A * | 12/1993 | Busenberg | .......... | 348/144 |
| 5,428,717 A * | 6/1995 | Glassner | .......... | 345/423 |
| 5,487,172 A * | 1/1996 | Hyatt | .......... | 712/32 |
| 6,184,860 B1 * | 2/2001 | Yamakawa | .......... | 715/823 |
| 6,333,740 B1 * | 12/2001 | Kojima | .......... | 345/419 |
| 6,515,675 B1 * | 2/2003 | Bourdev | .......... | 345/629 |
| 6,720,977 B1 * | 4/2004 | Bourdev et al. | .......... | 345/629 |
| 6,727,906 B2 * | 4/2004 | Lockeridge et al. | .......... | 345/581 |
| 6,768,488 B1 * | 7/2004 | Kotani et al. | .......... | 345/441 |
| 6,894,704 B1 * | 5/2005 | Bourdev et al. | .......... | 345/629 |
| 6,982,723 B1 * | 1/2006 | Szymaniak | .......... | 345/611 |
| 7,024,050 B2 * | 4/2006 | Kondo et al. | .......... | 382/254 |
| 2004/0017378 A1 * | 1/2004 | Lin et al. | .......... | 345/592 |
| 2004/0075663 A1 * | 4/2004 | Plante | .......... | 345/474 |
| 2004/0175035 A1 * | 9/2004 | Kameyama | .......... | 382/173 |
| 2004/0189667 A1 * | 9/2004 | Beda et al. | .......... | 345/619 |
| 2005/0017984 A1 * | 1/2005 | Lawther et al. | .......... | 345/589 |
| 2005/0231511 A1 * | 10/2005 | Doepke et al. | .......... | 345/473 |
| 2006/0055700 A1 * | 3/2006 | Niles et al. | .......... | 345/473 |
| 2006/0059432 A1 * | 3/2006 | Bells | .......... | 715/768 |
| 2006/0082597 A1 * | 4/2006 | McDaniel et al. | .......... | 345/648 |
| 2006/0130095 A1 * | 6/2006 | Willis et al. | .......... | 725/42 |
| 2006/0157639 A1 * | 7/2006 | Shaffer et al. | .......... | 250/208.1 |
| 2006/0158450 A1 * | 7/2006 | Ferguson et al. | .......... | 345/423 |
| 2007/0058717 A1 * | 3/2007 | Chosak et al. | .......... | 375/240.08 |

OTHER PUBLICATIONS

Chang et al. "Automatic Cel Painting in Computer-assisted Cartoon Production using Similarity Recognition." The Journal of Visualization and Computer Animation, vol. 8: 165-185. 1997.
Flip Book User's Guide & Tutorial. DigiCel, Inc. Goodyear, AZ.

* cited by examiner

*Primary Examiner*—Ulka Chauhan
*Assistant Examiner*—Jeffrey J Chow
(74) *Attorney, Agent, or Firm*—Van Pelt, Yi & James LLP (57) ABSTRACT

Assigning an attribute is disclosed. Assigning an attribute includes receiving a first region from a first frame, wherein the first region is associated with an attribute, receiving a second region from a second frame, and automatically assigning the attribute to the second region.

34 Claims, 10 Drawing Sheets

ASSIGNING ATTRIBUTES TO REGIONS ACROSS FRAMES

BACKGROUND OF THE INVENTION

Animation may be used to display a moving object, such as a person, a car, or a ball. Animation can be created and edited in software using various animation applications. A typical animation includes a plurality of frames. Each frame depicts an object comprised of a set of paths that define enclosed regions. Each region may be filled with an attribute, such as color. Between frames, the object, and therefore a region corresponding to the object, may move. Typically, a user manually colors each region in each frame in order to ensure that an object retains the same color between frames. Onion skinning is a method that may be used to assist the user in manually coloring regions across frames. In onion skinning, multiple frames are overlaid, so that the user can color regions in multiple frames at once. However, even with onion skinning, each region still needs to be manually colored by the user. The user has to manually inspect overlapping regions across frames and determine whether they correspond before coloring them. In addition, onion skinning is less useful when an object is moving quickly, and there is little or no overlap of corresponding regions between frames. An improved method of coloring regions across frames is needed.

BRIEF DESCRIPTION OF THE DRAWINGS

Various embodiments of the invention are disclosed in the following detailed description and the accompanying drawings.

DETAILED DESCRIPTION

The invention can be implemented in numerous ways, including as a process, an apparatus, a system, a composition of matter, a computer readable medium such as a computer readable storage medium encoded with a computer program product or a computer network wherein program instructions are sent over optical or electronic communication links. In this specification, these implementations, or any other form that the invention may take, may be referred to as techniques. A component such as a processor or a memory described as being configured to perform a task includes both a general component that is temporarily configured to perform the task at a given time or a specific component that is manufactured to perform the task. In general, the order of the steps of disclosed processes may be altered within the scope of the invention.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Figure 1:
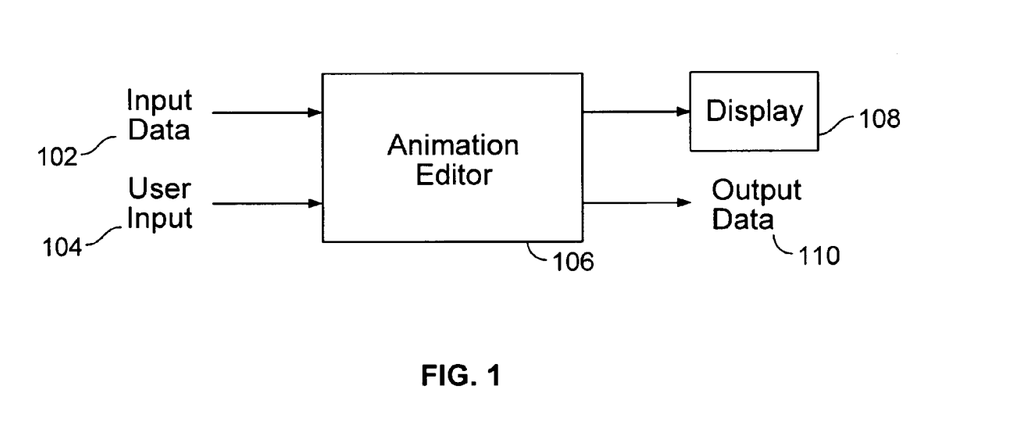
FIG. 1 is a block diagram illustrating an embodiment of a system for editing animation data.

FIG. 1 is a block diagram illustrating an embodiment of a system for editing animation data. In the example shown, input data 102 and user input 104 are provided as input to animation editor 106. Animation editor 106 may include an animation application, such as Adobe® After Effects®, Macromedia®& Flash®, or any other animation software. Input data 102 may include data used by animation editor 106 to create animation data. For example, input data 102 may include frames or images in various input data formats, such as vector or raster formatted data. Animation editor 106 may be able to handle various formats, and may include, for example, a raster to vector converter. Input data 102 may include metadata, configuration data, settings, or other information that may be used by animation editor 106, for example, in a Moving Picture Experts Group (MPEG) format. A user may provide user input 104 as input to animation editor 106 to interact with animation editor 106 and/or display 108. User input 104 may be provided using any input device, such as a keyboard, a touchpad, a mouse or any other pointing device. Animation editor 106 may provide data to display 108 for the user to view and respond to. Output data 110 may be provided as output from animation editor 106. For example, output data 110 may include animation files produced by animation editor 106. Input data 102 may include previously generated output data 110. In some embodiments, animation editor 106 is configured to predict or automatically determine an attribute of a region, as more fully described below.

Figure 2A:
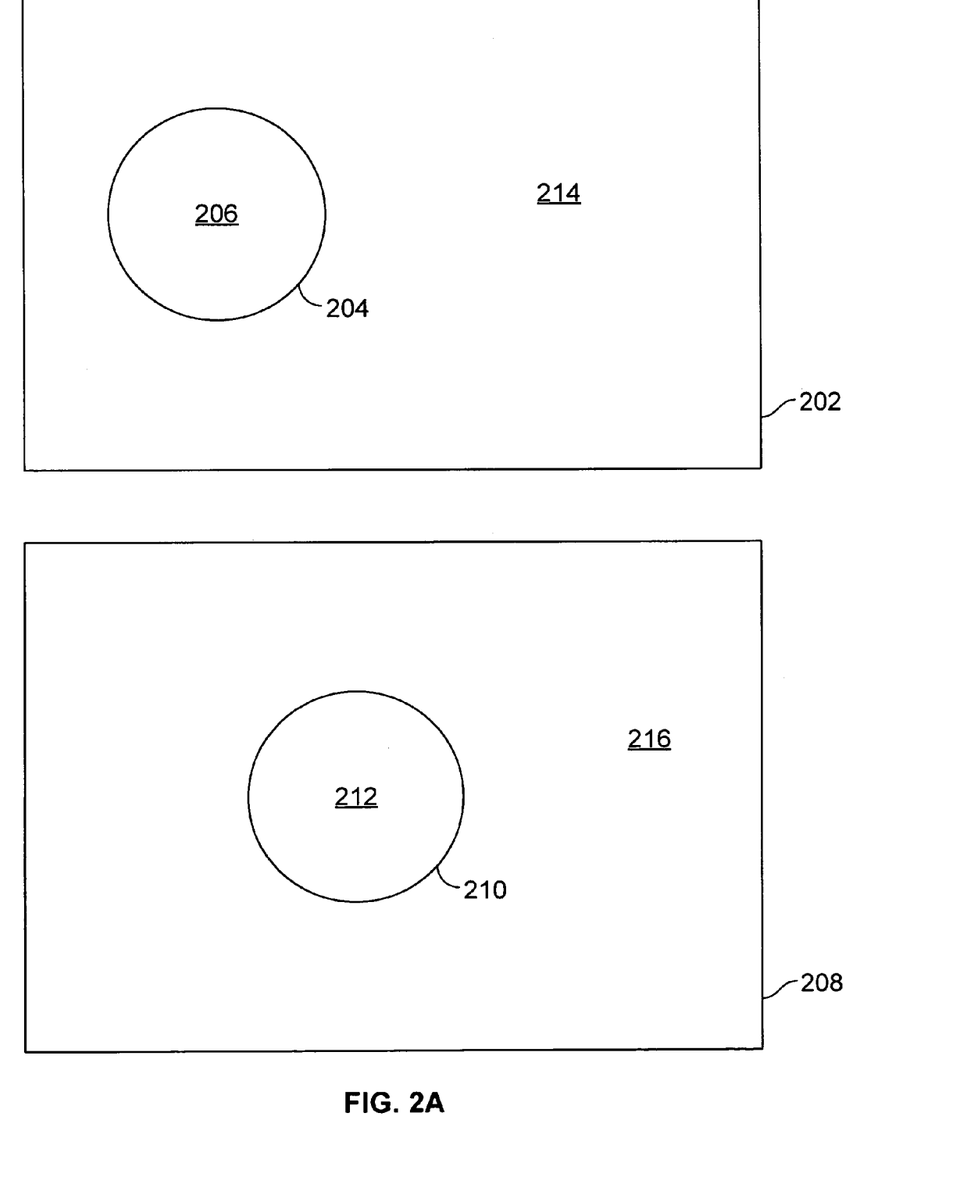
FIG. 2A illustrates an example of two frames of animation data.

FIG. 2A illustrates an example of two frames of animation data. In this example, frames 202 and 208 may have been created by a user. For example, they may have been hand drawn and then scanned into a digital format. Alternatively, they may have been created digitally to begin with using a drawing application. Frames 202 and 208 depict an object (in this case, a ball) rolling from left to right. In this example, frame 202 is colored and frame 208 needs to be colored.

Frame 202 includes path 204, which defines region 206 and background 214. Region 206 corresponds to the ball. Region 206 and background 214 may each be associated with an attribute. An attribute, as used herein, includes a fill associated with a region. Examples of attributes include color, absence of color (transparent), a pattern (e.g., hatching), a texture, a gradient, a portion of an image, and an abstract attribute, such as an identifier. In this example, region 206 is purple and background 214 is yellow. As used herein, the "coloring" is associated with assigning an attribute to a region.

Frame 208 includes path 210, which defines region 212 and background 216. Background 216 is yellow. An attribute is not yet assigned to region 212. In some embodiments, when a region is not assigned an attribute, it is associated with a transparent attribute. In this case, region 212 is transparent. By manual inspection, a user may determine that region 212 corresponds to the ball and should have the same attribute as region 206 (purple). In some embodiments, the attribute is automatically determined, as more fully described below.

Figure 2B:
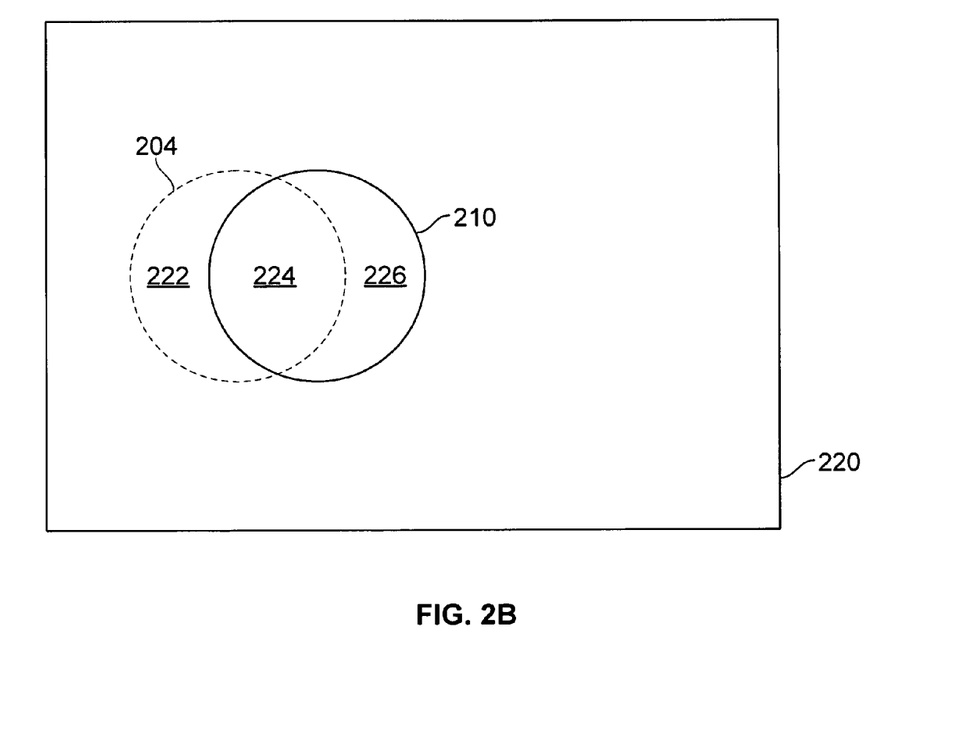
FIG. 2B illustrates an example of one frame overlaid on another frame.

FIG. 2B illustrates an example of one frame overlaid on another frame. In this example, frame 220 illustrates paths 204 and 210 when frames 202 and 208 are overlaid. As shown, path 204 intersects with path 210 to create subregions 222, 224, and 226. Region 206 becomes subregions 222 and 224. Region 206 is purple, so subregions 222 and 224 are purple. Region 212 becomes subregions 224 and 226. Region 212 is associated with the attribute transparent. In some embodiments, when a subregion is derived from a transparent region, it takes on its apparent attribute (the color it appears to be). Because subregion 226 is transparent, it appears to have the background attribute (yellow). As such, subregion 226 is associated with the attribute yellow.

An attribute may be assigned to region 212 by deleting path(s) associated with frame 202, or path 204. When path 204 is deleted, subregions 224 and 226 are merged into region 212. An attribute may be selected for region 212 based at least in part on the areas of subregions 224 and 226. If subregion 224 has a greater area than subregion 226, then region 212 is assigned the attribute of subregion 224 (purple). If subregion 226 has a greater area than subregion 224, then region 212 is assigned the attribute associated with subregion 226 (yellow). In this example, subregion 224 has a greater area than subregion 226, so region 212 is assigned the attribute purple.

Figure 3:
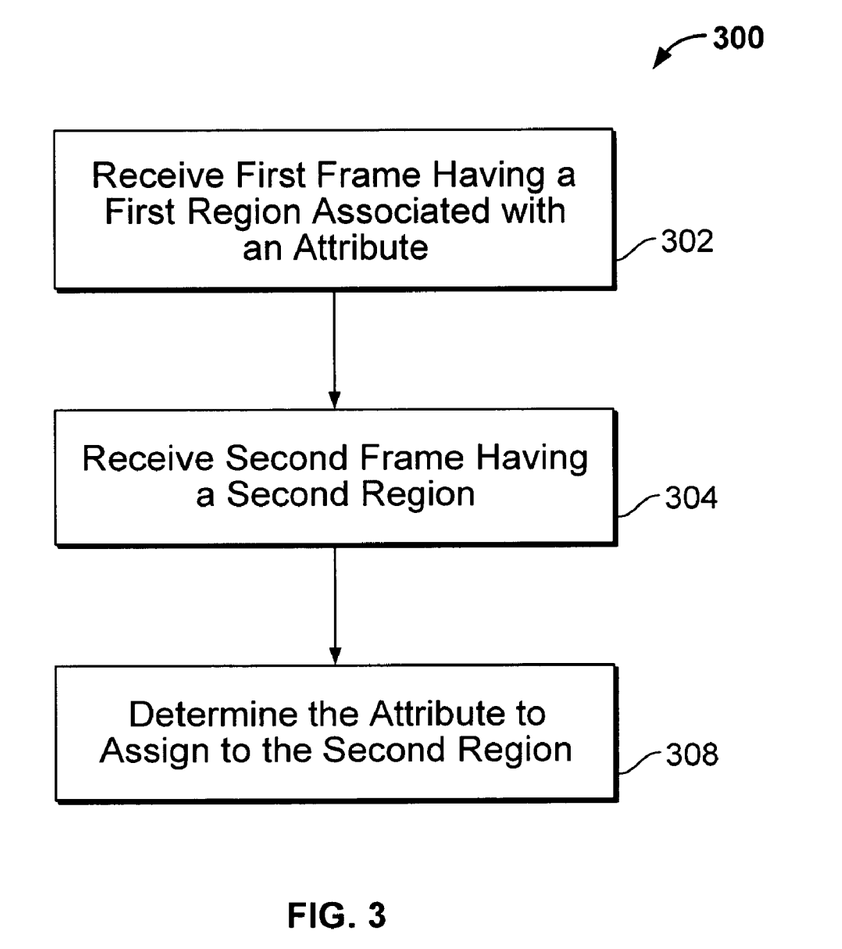
FIG. 3 is a flow chart illustrating an embodiment of a process for assigning an attribute.

FIG. 3 is a flow chart illustrating an embodiment of a process for determining an attribute. Process 300 may be implemented by animation editor 106 to color a region in a frame of animation. For example, a user may create a plurality of frames of animation. The user may color one frame and animation editor 106 may automatically color the remaining frames.

In the example shown, the process begins at 302. A first frame having a first region associated with an attribute is received. The first frame may depict an object, such as a purple ball. For example, frame 202 having region 206 associated with the attribute purple is received. At 304, a second frame having a second region is received. The second frame may be a frame that is displayed before or after the first frame when playing the animation. The second region may correspond to the first region. For example, frame 208 having region 212 is received and the first region and the second region both may depict a purple ball.

Receiving may include identifying or selecting a region and/or frame. For example, a user may identify a region in a frame. A user may identify start/stop frames. An automatic process may identify or select a region and/or frame.

At 308, the attribute to assign to the second region is determined. For example, the attribute to assign to region 212 is determined. The attribute may be automatically determined. In some embodiments, the attribute is determined based at least in part on an area of a subregion, as more fully described below.

308 may be performed for each region to be colored in the second frame. In some embodiments, a plurality of frames may be colored by performing 304-308 for each frame. After automatically coloring each frame, a user may manually make corrections to attribute assignments.

In some embodiments, a layering technique is used. Each object may be animated separately in different layers. The process may be performed separately on objects in each layer. An attribute from one layer is not necessarily used in another layer.

Figure 4:
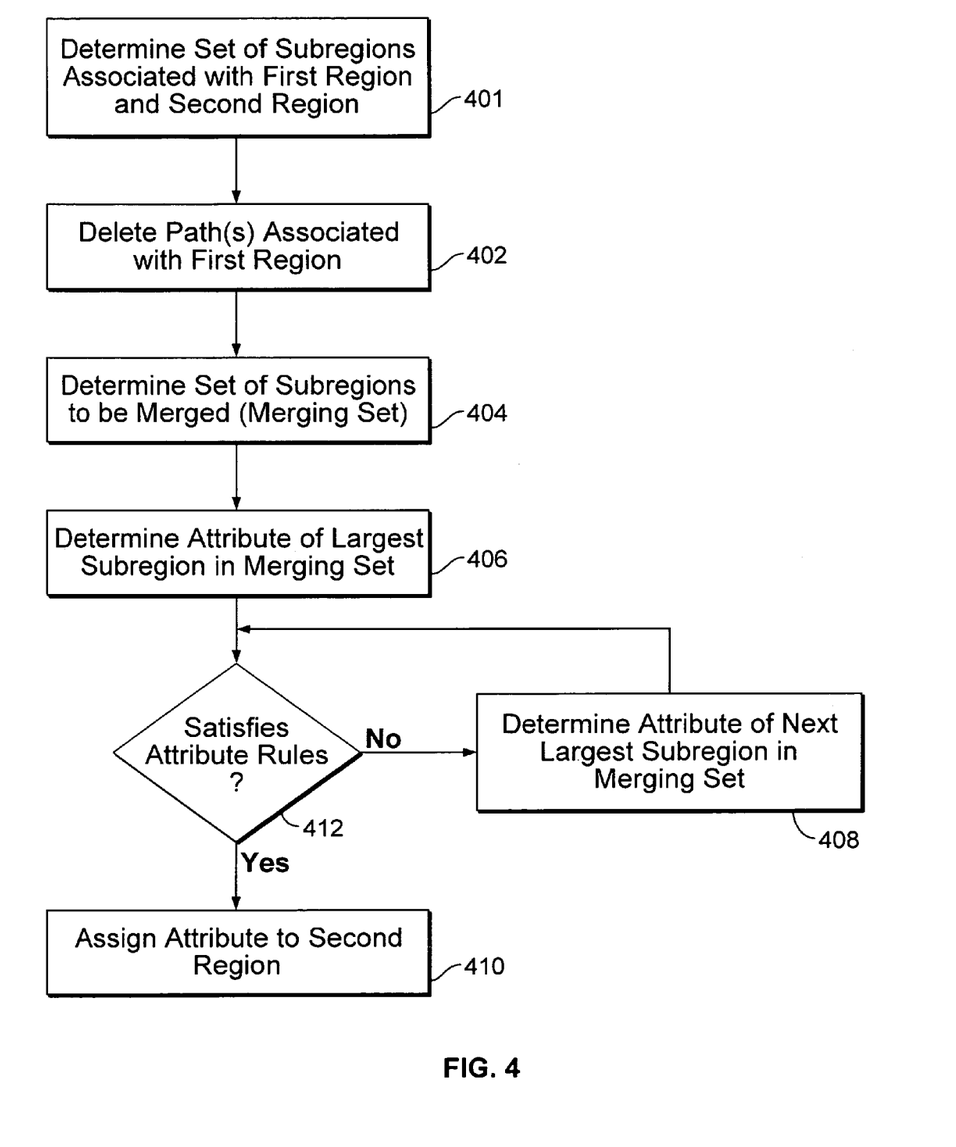
FIG. 4 is a flow chart illustrating an embodiment of a process for automatically determining an attribute.

FIG. 4 is a flow chart illustrating an embodiment of a process for automatically determining an attribute. In some embodiments, this process is used to implement 308. At 401, a set of subregions associated with the first region and the second region is determined. For example, frame 202 is overlaid on frame 208 (or vice versa) and subregions 222, 224, and 226 are determined. At 402, one or more paths associated with the first region are deleted. For example, path 204 is deleted from frame 220. At 404, a set of subregions to be merged is determined. As used herein, "merging set" refers to the set of subregions to be merged. For example, when path 204 is deleted from frame 220, subregions 224 and 226 will be merged. In this case, the merging set includes subregions 224 and 226.

At 406, the attribute of the largest subregion in the merging set is determined. In some embodiments, the largest subregion is the subregion with the greatest area. For example, of subregions 224 and 226, subregion 224 is the larger subregion. The attribute of subregion 224 is purple. At 408, it is determined whether attribute rules are satisfied. One or more attribute rules may be specified. Attribute rules are more fully described below. If the attribute rules are satisfied, the attribute is assigned to the second region at 410. If the attribute rules are not satisfied, the next largest subregion in the merging set is determined at 408. For example, if for some reason the attribute purple does not satisfy the attribute rules, then subregion 226 is the next largest subregion after subregion 224. The attribute of subregion 226 is yellow. The process returns to 412, and it is determined whether the attribute rules are satisfied. In case no attribute satisfies the attribute rules, the region may remain uncolored or a default attribute may be assigned.

Figure 5A:
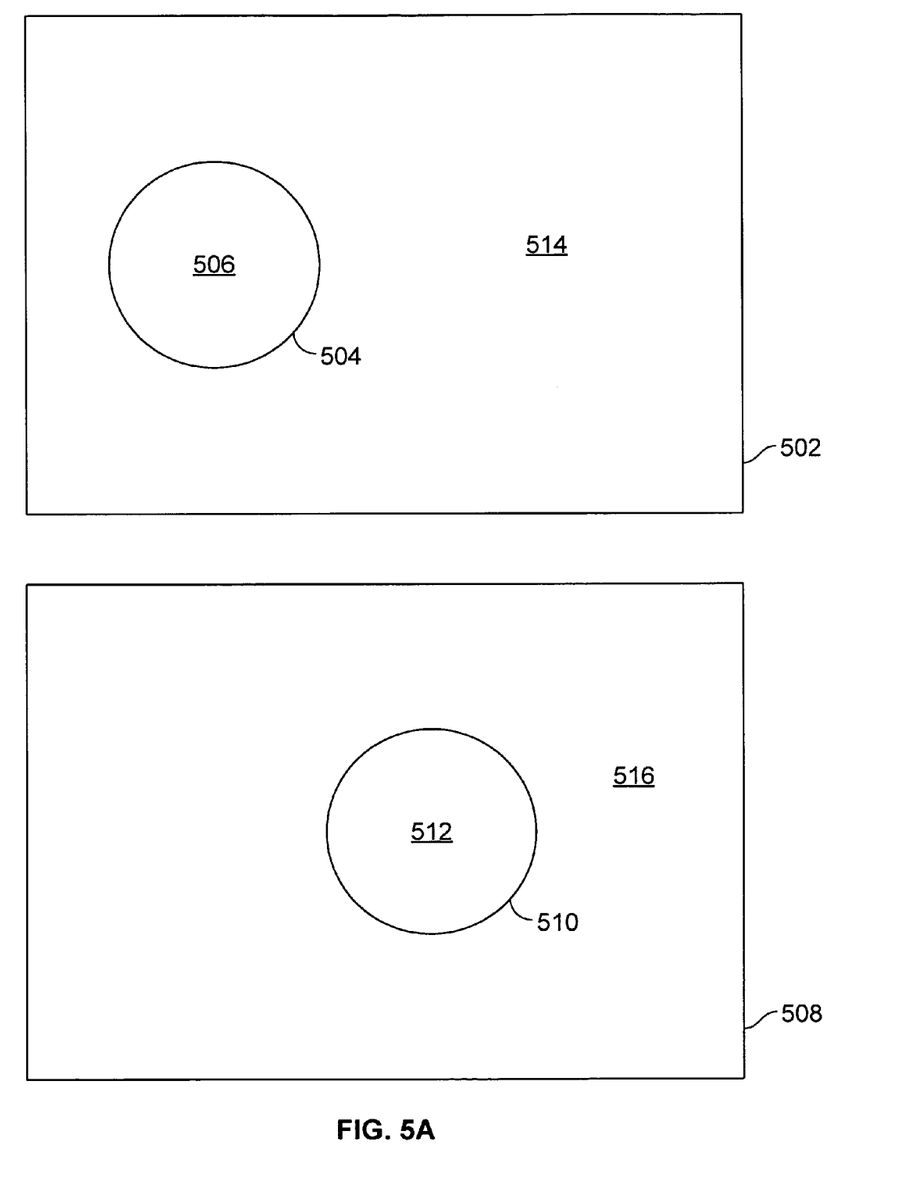
FIG. 5A illustrates an example of two frames of animation data.

FIG. 5A illustrates an example of two frames of animation data. In this example, frames 502 and 508 may have been created by a user. For example, they may have been hand drawn and then scanned into a digital format. Alternatively, they may have been created digitally to begin with using a drawing application. Frames 502 and 508 depict an object (in this case, a ball) rolling from left to right. Frame 502 is colored and frame 508 needs to be colored.

Frame 502 includes path 504, which defines region 506 and background 514. Region 506 corresponds to the ball. Region 506 and background 514 may each be associated with an attribute. In this example, region 506 is purple and background 514 is yellow.

Frame 508 includes path 510, which defines region 512 and background 516. Background 516 is yellow. An attribute is not yet assigned to region 512, so region 512 is associated with the attribute of transparent.

Figure 5B:
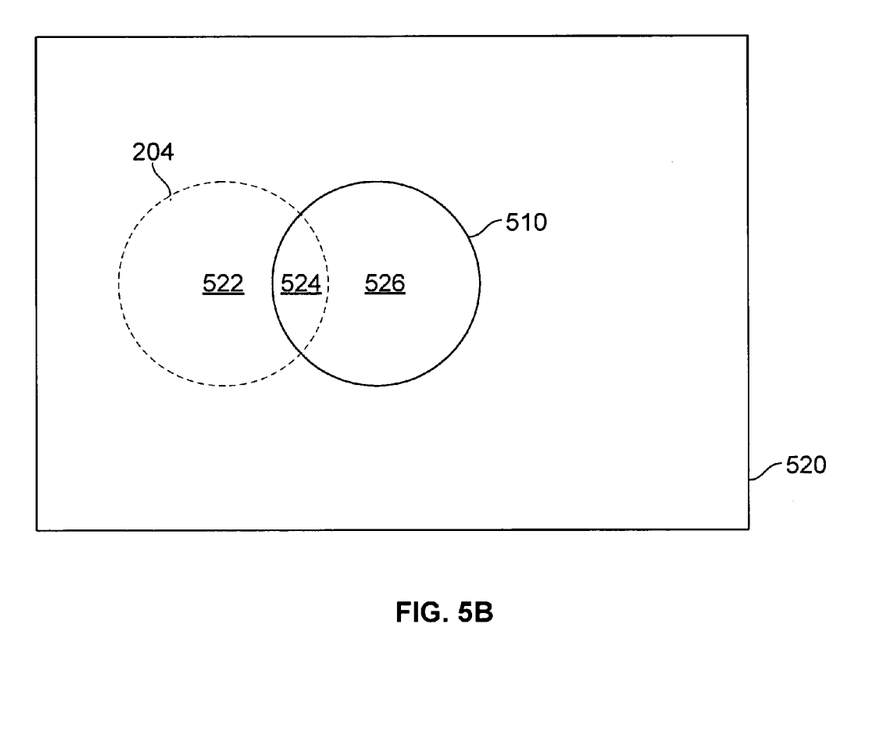
FIG. 5B illustrates an example of one frame overlaid on another frame.

FIG. 5B illustrates an example of one frame overlaid on another frame. In this example, frame 520 illustrates paths 504 and 510 when frames 502 and 508 are overlaid. As shown, path 504 intersects with path 510 to create subregions 522, 524, and 526. Region 506 becomes subregions 522 and 524. Region 506 is purple, so subregions 522 and 524 are purple. Region 512 becomes subregions 524 and 526. Region 512 is associated with the attribute transparent, so subregion 526 is associated with the attribute yellow.

An attribute may be assigned to region 512 by deleting path(s) associated with frame 502, or path 504. When path 504 is deleted, subregions 524 and 526 are merged into region 512. An attribute may be selected for region 512 based at least in part on the areas of subregions 524 and 526. If subregion 524 has a greater area than subregion 526, then region 512 is assigned the attribute of subregion 524 (purple). If subregion 526 has a greater area than subregion 524, then region 512 is assigned the attribute associated with subregion 526 (yellow). In this example, subregion 526 has a greater area than subregion 526, so region 512 is initially assigned the attribute yellow, which may not be desirable.

In some embodiments, there may be attribute rules that are checked before assigning an attribute. Attribute rules may specify that a background attribute not be assigned to a region that borders the background, as illustrated in the following example.

Figure 6:
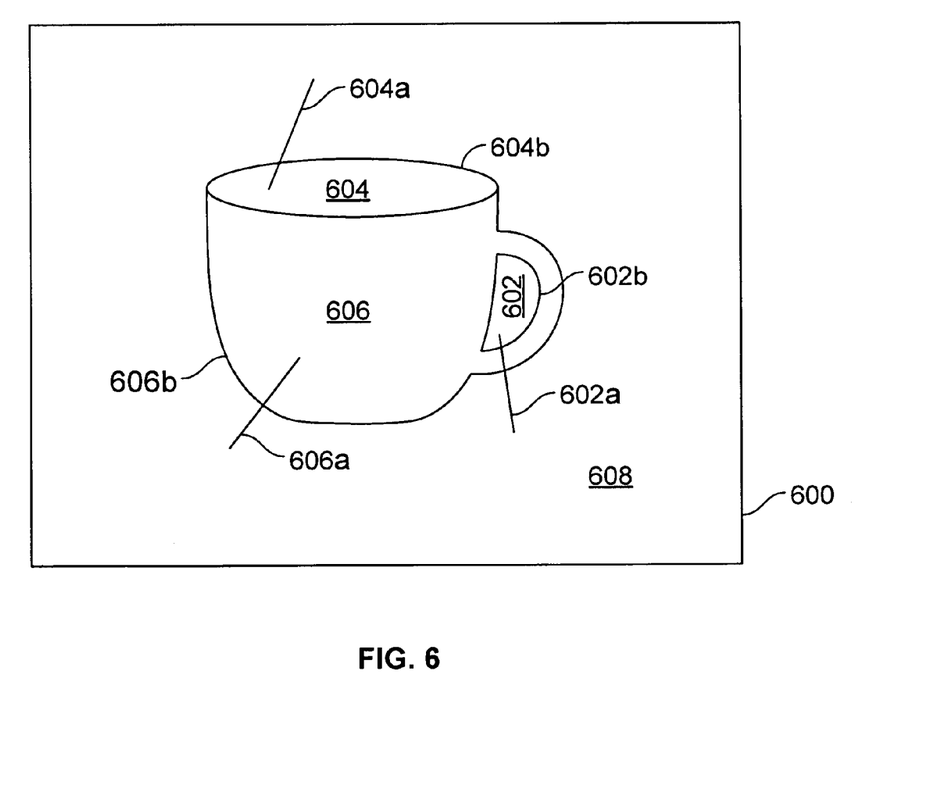
FIG. 6 illustrates an example of an object having a region that borders the background.

FIG. 6 illustrates an example of an object having a region that borders the background. In this example, frame 600 depicts a tea cup. Frame 600 includes region 604 associated with path 604b, region 606 associated with path 606b, and region 602 associated with path 602b. As shown, region 606 depicts the outside of the tea cup, including the handle. Region 604 depicts the inside of the tea cup. Region 602 depicts the handle opening of the tea cup. Region 608 is the background. In this example, regions 602 and 608 are both yellow.

A region that borders the background refers to a region that shares an edge with the background. A region borders the background if at least one test path can be drawn from the inside of the region to the background that crosses one and only one line. For example, regions 604 and 606 border the background. Test path 604a drawn from inside region 604 to background 608 crosses one line, path 604b. Similarly, test path 606a drawn from inside region 606 to the background crosses one line, path 606b. Region 602 does not border the background. Test path 602a drawn from inside region 602 to the background crosses two lines, paths 602b and 606b. In this example, it is impossible to draw a test path from region 602 to the background that does not cross at least two lines.

Returning to FIG. 5B, although subregion 526 is larger than subregion 524, an attribute rule may be used to prevent the background attribute (yellow) from being assigned to region 512 because region 512 borders the background. Thus, the color of region 524 (purple) is assigned to region 512.

Other attribute rules may be specified. For example, attribute rules may specify that a stroke attribute not be assigned to a region, as illustrated in the following example.

Figure 7A:
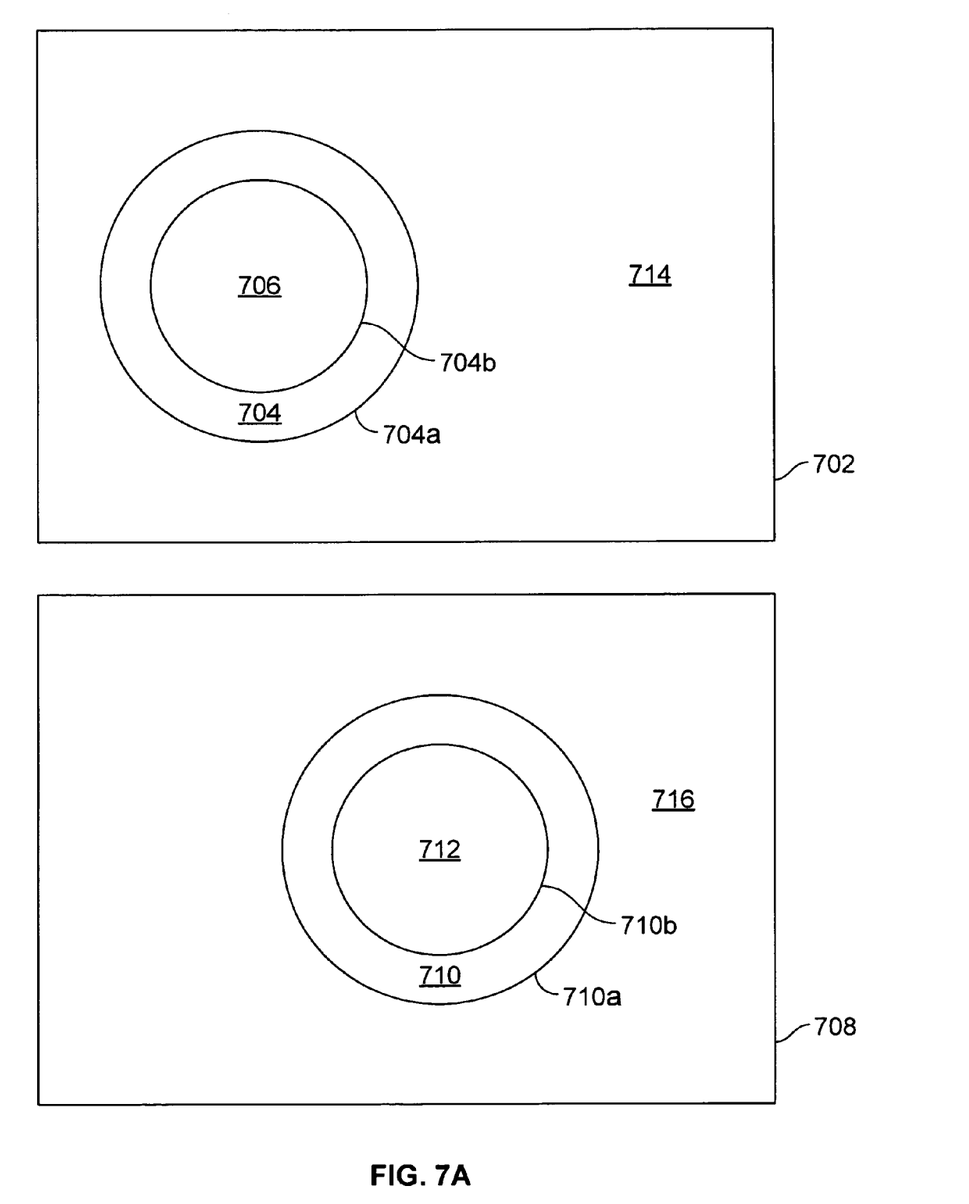
FIG. 7A illustrates an example of two frames of animation data with thick strokes.

FIG. 7A illustrates an example of two frames of animation data with thick strokes. In this example, frames 702 and 708 may have been created by a user. Frames 702 and 708 depict an object (in this case, a ball) rolling from left to right. In this example, frame 702 is colored and frame 708 needs to be colored.

In this example, images were hand drawn using a pen with a thick stroke. A stroke refers to a line having a width. In this case, the width is variable since the line was hand drawn. The images were then scanned into a raster format. The raster format was converted to a vector format. In the vector format, the thick strokes became paths around regions filled with the stroke color.

Frame 702 includes paths 704a and 704b, which define regions 704, 706 and 714. Region 706 corresponds to the ball. Region 704 is associated with a thick stroke. In this example, region 704 is black (the stroke color), region 706 is purple (the ball color), and background 714 is yellow.

Frame 708 includes paths 710a and 710b, which define regions 710, 712 and 716. Region 710 is associated with a thick stroke. In this example, region 710 is black (the stroke color) and background 716 is yellow. An attribute is not yet assigned to region 712, so region 712 is associated with the attribute transparent.

Figure 7B:
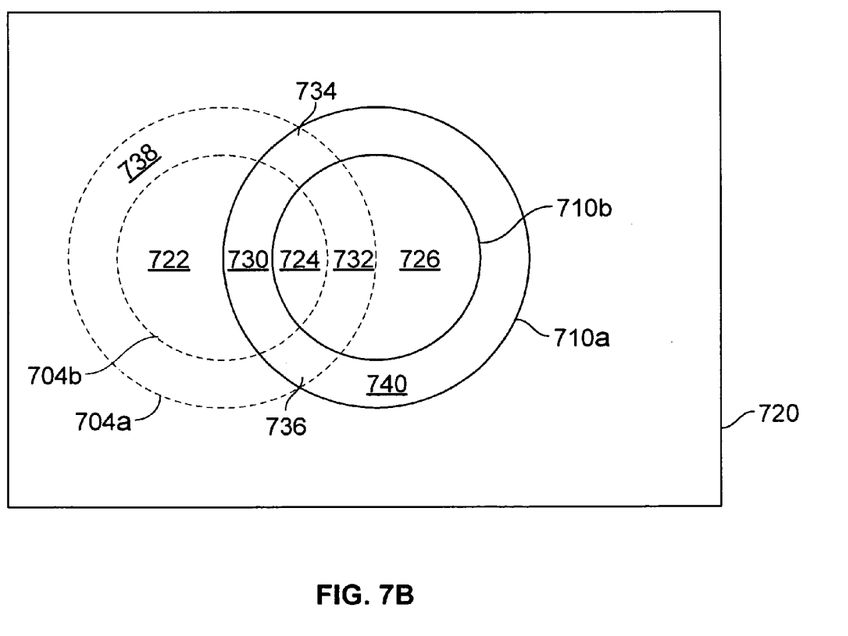
FIG. 7B illustrates an example of one frame overlaid on another frame.

FIG. 7B illustrates an example of one frame overlaid on another frame. In this example, frame 720 illustrates paths 704a, 704b, 710a, and 710b when frames 702 and 708 are overlaid. As shown, the paths intersect to create subregions 722-740. Region 706 becomes subregions 722, 724, and 730. Region 706 is purple, so subregions 722 and 724 are purple. Region 712 becomes subregions 724, 726, and 732. Region 712 is associated with the attribute transparent, so subregion 726 is associated with the attribute yellow. Region 704 becomes subregions 732-738, which remain black. Region 710 becomes subregions 730, 734, 736, and 740, which remain black.

To account for thick strokes, subregions associated with strokes may be considered lines when determining an attribute to assign. For example, subregions 730, 734, 736, and 740 may be considered as lines, such that 726 borders the background.

An attribute may be assigned to region 712 by deleting path(s) associated with frame 702 (i.e., paths 704a and 704b). When paths 704a and 704b are deleted, subregions 724, 726, and 732 are merged into region 712. An attribute may be selected for region 712 based at least in part on the areas of subregions 724, 726, and 732. The subregion with the greatest area is subregion 726 associated with attribute yellow. However, subregion 726 borders the background (since paths 710a and 710b are borders of one thick line). In this example, the attribute rules specify that the background attribute not be assigned to a region bordering the background. Therefore, because yellow is the background color, yellow is not assigned to region 712.

The next largest subregion of subregions 724, 726, and 732 is subregion 732. However, subregion 732 is black, the stroke color. In this example, the attribute rules specify that the stroke attribute cannot be assigned to a region. Therefore, because black is the stroke attribute, black is not assigned to region 712. The next largest subregion is subregion 724 with attribute purple. Assigning attribute purple to region 712 satisfies the attribute rules. Therefore, attribute purple is assigned to region 712.

As shown in this example, a single line stroke may vectorized into two paths and a region between the two paths. Information may be stored to indicate paths associated with single line strokes, such as paths 710a and 710b. This may be useful if a porous stroke is being processed. For example, a medium such as charcoal or crayon may produce a stroke with holes or gaps.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method, comprising:
   identifying a first region from a first frame of animation;
   identifying a second region from a second frame of animation; and
   automatically assigning a fill to the second region using a processor, including:
   overlaying the first frame and the second frame;
   identifying a merging set of two or more subregions that are included in the second region, wherein the two or more subregions includes an overlapping subregion that overlaps with the first region;

computing a geometric area of each of the subregions in the merging set;
determining which subregion has a greatest geometric area;
selecting, as the assigned fill, a fill of the subregion that has the greatest geometric area;
merging the merging set of subregions into the second region; and
filling the second region, including the overlapping subregion, with only the assigned fill; and
displaying the second region on a display.

2. A method as recited in claim 1, further including deriving a set of one or more subregions from the first region and the second region.

3. A method as recited in claim 1, further including deriving a set of one or more subregions by combining the first region and the second region.

4. A method as recited in claim 1, wherein automatically assigning is based at least in part on an area of a subregion derived from the first region and the second region.

5. A method as recited in claim 1, wherein the fill includes a color.

6. A method as recited in claim 1, wherein the first region and the second region are associated with an animated object.

7. A method as recited in claim 1, further including determining that a first subregion is larger in area than a second subregion, wherein the first subregion and the second subregion are derived from the first region and the second region.

8. A method as recited in claim 1, further including comparing a plurality of areas associated with a set of subregions, wherein the set of subregions is derived from the first region and the second region.

9. A method as recited in claim 1, wherein automatically assigning a fill to the second region further includes determining whether the fill satisfies an attribute rule.

10. A method as recited in claim 1, wherein automatically assigning a fill to the second region further includes determining whether the second region borders a background.

11. A method as recited in claim 10, wherein the second region borders a background if at least one test path can be drawn from the inside of the second region to the background that crosses exactly one line.

12. A method as recited in claim 9, wherein the attribute rule includes not permitting a background fill to be assigned to the second region if the second region borders a background and wherein determining whether the fill satisfies and attribute rule includes:
determining whether the assigned fill is a background fill; and
in the event that the assigned fill is a background fill, changing the assigned fill to a fill other than the background fill.

13. A method as recited in claim 12, wherein the second region borders a background if at least one test path can be drawn from the inside of the second region to the background that crosses exactly one line.

14. A method as recited in claim 9, the attribute rule includes not permitting a stroke fill to be assigned to the second region and wherein determining whether the fill satisfies and attribute rule includes:
determining whether the assigned fill is a stroke fill; and
in the event that the assigned fill is a stroke fill, changing the assigned fill to a fill other than the stroke fill.

15. A method as recited in claim 1, wherein the first frame precedes the second frame in an animation.

16. A method as recited in claim 1, wherein the first region and the second region overlap.

17. A method as recited in claim 1, wherein automatically assigning further includes determining the largest subregion in the merging set.

18. A method as recited in claim 1, wherein the fill is the fill of the largest subregion in the merging set.

19. A method as recited in claim 1, wherein computing includes:
determining a first area of a first subregion and a second area of a second subregion; and
in the event that the first area is greater than the second area, assigning a fill of the first subregion to the second region; and
in the event that the second area is greater than the first area, assigning a fill of the second subregion to the second region.

20. A method as recited in claim 19, wherein the fill of the second region consists of only the assigned fill.

21. A method as recited in claim 1, wherein the second region, when rendered on the display, contains a plurality of pixels.

22. A method as recited in claim 1, wherein automatically assigning a fill to the second region further includes filling the second region with the assigned fill.

23. A method as recited in claim 1, wherein identifying includes identifying a second region that has not yet been assigned a fill.

24. A method as recited in claim 1, wherein identifying includes identifying a second region that has not yet been assigned a fill and is associated with a transparent attribute.

25. A computer readable storage medium encoded with a computer program product for editing, the computer program product comprising computer instructions for:
identifying a first region from a first frame of animation;
identifying a second region from a second frame of animation; and
automatically assigning a fill to the second region, including:
overlaying the first frame and the second frame;
identifying a merging set of two or more subregions that are included in the second region, wherein the two or more subregions includes an overlapping subregion that overlaps with the first region;
computing a geometric area of each of the subregions in the merging set;
determining which subregion has a greatest geometric area;
selecting, as the assigned fill, a fill of the subregion that has the greatest geometric area;
merging the merging set of subregions into the second region; and
filling the second region, including the overlapping subregion, with only the assigned fill; and
displaying the second region on a display.

26. A computer readable storage medium as recited in claim 25, the computer program product further comprising computer instructions for deriving a set of one or more subregions from the first region and the second region.

27. A computer readable storage medium as recited in claim 25, wherein automatically assigning is based at least in part on an area of a subregion derived from the first region and the second region.

28. A computer readable storage medium as recited in claim 25, the computer program product further comprising computer instructions for determining that a first subregion is larger in area than a second subregion, wherein the first subregion and the second subregion are derived from the first region and the second region.

29. A computer readable storage medium as recited in claim 25, the computer program product further comprising computer instructions for determining whether the fill satisfies an attribute rule.

30. A system, comprising:
a processor; and
a memory coupled with the processor, wherein the memory is configured to provide the processor with instructions which when executed cause the processor to:
identify a first region from a first frame of animation;
identify a second region from a second frame of animation; and
automatically assign a fill to the second region, including:
overlay the first frame and the second frame;
identify a merging set of two or more subregions that are included in the second region, wherein the two or more subregions includes an overlapping subregion that overlaps with the first region;
compute a geometric area of each of the subregions in the merging set;
determine which subregion has a greatest geometric area;
selecting, as the assigned fill, a fill of the subregion that has the greatest geometric area;
merge the merging set of subregions into the second region; and
fill the second region, including the overlapping subregion, with only the assigned fill; and
display the second region on a display.

31. A system as recited in claim 30, wherein the memory is configured to further provide the processor with an instruction which when executed causes the processor to derive a set of one or more subregions from the first region and the second region.

32. A system as recited in claim 30, wherein the memory is configured to provide the processor with an instruction which when executed causes the processor to automatically assign based at least in part on an area of a subregion derived from the first region and the second region.

33. A system as recited in claim 30, wherein the memory is configured to further provide the processor with an instruction which when executed causes the processor to determine that a first subregion is larger in area than a second subregion, wherein the first subregion and the second subregion are derived from the first region and the second region.

34. A system as recited in claim 30, wherein the memory is configured to further provide the processor with an instruction which when executed causes the processor to determine whether the fill satisfies an attribute rule.

* * * * *